United States Patent Office 3,608,170
Patented Sept. 28, 1971

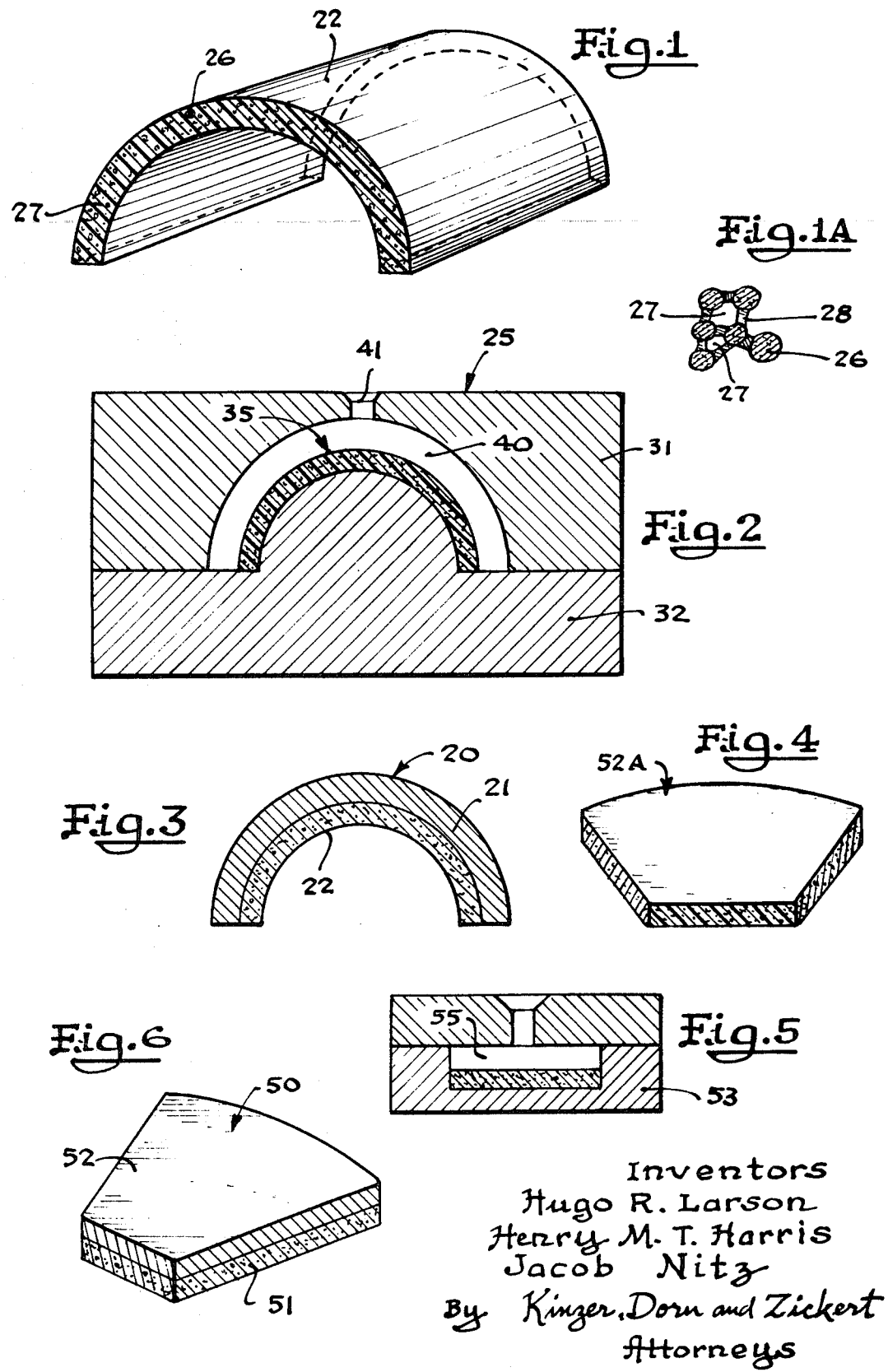

3,608,170
METAL IMPREGNATED COMPOSITE CASTING METHOD
Hugo R. Larson, Ridgewood, N.J., Henry M. T. Harris, Meadville, Pa., and Jacob Nitz, Maple Heights, Ohio, assignors to Abex Corporation, New York, N.Y.
Filed Apr. 14, 1969, Ser. No. 815,819
Int. Cl. B21d 53/10; B22d 23/00
U.S. Cl. 29—149.5PM                              6 Claims

ABSTRACT OF THE DISCLOSURE

Composite metal-non-metal structures are obtained by first molding a porous perform of the non-metal in particulate form using a binder which will bond the particles by pyrolysis phenomenon. The preform is then transferred to a mold where it is thoroughly impregnated by molten metal.

This invention relates to the production of composite metal-non-metal bodies where friction and wear resistance properties may be widely varied by selecting unique combinations of metals and non-metal.

It is customary in foundry practices today to produce sleeve-type bearings by casting a backing, say from bronze, and then separately lining the bore of the backing with an appropriate metal such as Babbitt metal. There are of course other combinations, but it would be desirable for some applications to have an anti-fraction lining principally of graphite, itself penetrated by the backing metal to afford a matrix for graphite particles. We know of no instance where a bearing of this character has been achieved, in any practical sense, the principal hurdle being the fact that the lining, of whatever nature, is necessarily of arcuate form. One object of the present invention is to achieve a bearing characterized by an arcuate lining of graphite particles penetrated by the same metal which affords the backing for the bearing, and a related object of the invention is to enable low friction particles such as graphite to be surrounded by a metal matrix regardless of contour whether the contour be flat or a radius.

Contrasted with anti-friction elements such as bearings, seals and the like, there is a form of friction element (a "friction element" herein is defined as a brake or clutch facing) which has not as yet been possible to achieve and that is one presenting particulate material at the friction face in a matrix of cast iron which also affords a backing entirely of metal, just as in the instance of a metal backing for a bearing. It is of course possible to produce by powder metal techniques a brake or clutch facing having a matrix of sponge iron, but not one of cast iron because of the molding difficulties presented by the cast iron particles.

Sponge iron is admirably suited to powder metallurgy inasmuch as the rough exterior of these iron particles as well as their deformability enables the particles to tightly interlace during pressing, with themselves and with the more smooth non-metal particles which may be present. This is not a characteristic of cast iron particles which ordinarily are relatively smooth and brittle, hence difficult to join to one another, and especially to smooth-surfaced non-metals, during pressing and sintering. Cast iron, on the other hand, is harder, stronger and more wear resistant than sponge iron, and hence is a more desirable material than sponge iron in these respects.

Also, it is possible to produce elements having non-metal particles dispersed wholly throughout a matrix of cast iron or other metal by following the teachings of U.S. Pat. No. 3,239,319, and while the process of that patent is eminently satisfactory for certain structural shapes, it is not readily applicable to production of a part which is to have a thick back entirely of metal and a face which is a mixture of metal and non-metal.

Other objects of the present invention are therefore to enable elements to be produced having a backing entirely of a predetermined metal and a face which presents both the metal and a non-metal, and to enable elements of pronounced radius to be produced in which a face thereof is a mixture of metal and non-metal.

Other and further objects of the present invention will be apparent from the following description and claims and are illustrated in the accompanying drawings which, by way of illustration, show preferred embodiments of the present invention and the principles thereof and what is not considered to be the best mode contemplated for applying these principles. Other embodiments of the invention embodying the same or equivalent principles may be used and structural changes may be made as desired by those skilled in the art without departing from the present invention.

In the drawings:

FIG. 1 is a perspective view of a preform lining for a bearing, sectioned at the end;

FIG. 1A is a greatly enlarged view showing the porous internal structure of the lining of FIG. 1;

FIG. 2 is a sectional view of a mold containing the lining of FIG. 1;

FIG. 3 is a sectional view of the bearing obtained from the mold of FIG. 2;

FIG. 4 is a section of another kind of preform, and

FIG. 5 is a sectional view of a mold containing the preform of FIG. 4; and

FIG. 6 is a view, partly in section, of the element obtained from the mold of FIG. 5.

Referring to FIG. 3, this is a section of a representative bearing 20 having a bronze backing 21 and a low friction lining 22, simplified as to contour and somewhat exaggerated in proportions. Moreover, it is only representative of a class of parts (bearings) under the present invention. Under and in accordance with the present invention, the anti-friction lining 22, lining the bore of the bearing, may be entirely of graphite particles contained in a matrix of the same metal which affords the backing 21.

The bearing 20 as thus afforded is unique in that the low friction lining contains particulate graphite in a matrix of bronze metal, and in achieving such structure the lining 22, FIG. 1, is initially produced as a relatively strong preform, strong enough to be handled in the foundry and manipulated in the mold 25, FIG. 2. In producing the preform, particulate graphite is first blended with a resin binder in the ratio of about 8 pounds of graphite to 1.6 pounds of resin binder, the latter preferably being a thermosetting resin of good carbonizing value, for example, a straight phenol formaldehyde resin, furfuryl alcohol. furfuryl aldehydes, phenol-furfuryls or mixtures thereof in the form of so-called "B" stage (incompletely cured) powder form. A phenol-furfuryl resin is preferred.

However, it is also possible in accordance with the present invention to blend the particulate material with a resin in liquid form, coating each particle, and then drying the thus coated particles so that each particle is enveloped in its own resin binder coat for reasons apparent from the description to follow.

It may furthermore be mentioned that inorganic binders may also be used, such as silicones, silicates, metallic phosphates, and so on, since the basic requirement of this phase of the invention is simply that the binder be thermally decomposable to deposit by pyrolysis a bond between and among the particles. In the instance of organic resins or plastics, the bond will be a carbon or graphitic bond producing carbon-to-carbon bonds among the particles; and in the instance of an inorganic binder such as sodium silicate, the bond would be a silica bond produced by pyrolysis phenomenon.

In any event, it is preferred that the graphite particles 26, FIGS. 1 and 1A, be mixed in the presence of a phenol-furfuryl resin 27 such that when the mixture is fired as hereinafter described, the resultant structure is porous, FIG. 1A, and is characterized by carbon-to-carbon bonds 28, FIG. 1A, joining the graphite particles 26. The pores 27, FIG. 1A, are continuous and inter-connected allowing for full infiltration of the graphite.

A measured amount of the blended mixture of graphite and resin particles in the proportions above mentioned is then added to and compressed slightly in an appropriately contoured mold, in the required amount to afford the thickness of the bearing preform lining, FIG. 1, and the mold is then transferred to an oven wherein it is exposed to a temperature of about 450° F. for about two hours, which partially cures the resin sufficiently to bind the graphite particles into a self-sustaining shape, FIG. 1, which need not be delicately handled. The resultant body is somewhat dense and almost completely non-porous. The resin is graphitized or carbonized and the preform body as a whole is rendered porous by heating the same in a non-oxidizing oven at about 1800° F. for one hour. The non-oxidizing environment may be nitrogen, or the preform presenting the resin to be graphitized or carbonized may be encased hermetically in a stainless steel wrap, thereby excluding oxygen.

After carbonizing the temporary binder at 1800° F. for one hour the preform is oven cooled to at least 300° F. before exposure for air cooling, then is transferred to a mold 25, FIG. 2. The mold 25 includes a cope 31 and a drag 32. The drag 32 includes a projection 33 presenting the contour of the graphitized, porous preform 35 which is set thereon as shown in FIG. 2.

The cope 31 of the mold is formed with a casting cavity 40 presenting the contour and dimensions of the backing 21 for the bearing 20, FIG. 3, and the top of the cope is provided with the usual opening 41 enabling molten metal to be poured into the cavity 40. The metal, in the instance of producing the bearing 20, will be a suitable bronze of standard bearing alloy, and in order to assure quick and effective penetration or infiltration of the molten metal completely into the pores of the graphite lining 35, a vacuum or pressure differential is preferably established within the mold, as disclosed in Pat. No. 3,239,319.

The resultant structure, FIG. 3, is characterized by a bronze backing 21 and a low friction graphite lining 22 penetrated by the same bronze metal which affords the bearing backing 21. Bronze mettal (or copper) itself possesses anti-friction qualities and hence only modifies the low friction quality of the graphite.

The present invention may be used to produce friction elements 50, FIG. 6, having a composite friction face 51 and a backing 52 integrated therewith but which is wholly of the metal which penetrates the porous friction face in the process of infiltration.

Again, FIG. 5, a porous preform 52A is first produced, in the general manner above described, and the preform is set in a recess in a mold drag 53, FIG. 5. The drag of the mold has a cavity 55 into which molten metal is introduced, preferably under a pressure differential, the molten metal thoroughly impregnating the pores of the preform and at the same time solidifying to afford the backing 52.

Again, an appropriately sized and shaped mold is loosely filled with the powder mixture, which in this insttance may also include metal powders such as copper or tin in addition to graphite, silicon carbide and molybdenum sulphide for imparting various degrees of friction modification for superior brake of clutch performance.

Obviously, as shown in FIGS. 3 and 5, the porous body to be infiltrated with molten metal does not fill entirely the mold cavity, but is of predetermined less thickness than the depth of the mold cavity so that there purposely remains an unoccupied portion of the mold cavity which will be filled entirely by the molten metal to constitute a homogeneous metal backing as 21 or 52 corresponding in thickness to the depth of the unoccupied portion of the mold cavity.

Examples of the powder mixture for the friction element preforms are as follows:

TABLE I

| | Copper | Graphite | Alumina | SiC | Tin | MoS$_2$ | Phenol furfuryl resin |
|---|---|---|---|---|---|---|---|
| Example: | | | | | | | |
| 1 | | 36.4 | | 36.4 | | 7.3 | 20.0 |
| 2 | | 40.0 | 40.0 | | | | 20.0 |
| 3 | | 26.7 | 26.7 | 26.7 | | | 20.0 |
| 4 | 40.0 | 20.0 | | 20.0 | | | 20.0 |
| 5 | 32.0 | 16.0 | | 16.0 | 16.0 | | 20.0 |
| 6 | 40.0 | 20.0 | | 20.0 | | | 20.0 |

The powders are blended to a state of uniformity, the molds are filled therewith using light tapping to settle the particles, and are then slightly compacted. The filled mold is baked for one-half hour at about 450° F. to cure the resin, whereafter the resultant (non-porous) preform, 52A, FIG. 4, is heated in a non-oxidizing atmosphere at about 1800° F. for about one hour to produce a strong preform characterized by both metal and non-metal powders joined by the graphitized or carbon-to-carbon bond.

The porosity of the preform is continuous as the result of loose packing, production of gases during decomposition of the temporary binder, and partial (thermal) destruction of the resin binder. The particle sizes of the constituents are not critical and may be selected on the basis of known combinations.

TABLE II.—ANALYSIS OF FIRED PREFORMS

| | Cu | Total C | Al$_2$O$_3$ | SiC | Sn | MoS$_2$ | Weight, gm. | Volume, cc. | Density, g./cc. | Porosity, Percent |
|---|---|---|---|---|---|---|---|---|---|---|
| Example: | | | | | | | | | | |
| 1 | | 54.50 | | 40.67 | | 6.75 | 164.4 | 159.1 | 1.03 | 56.3 |
| 2 | | 50.00 | 46.90 | | | | 202.2 | 163.7 | 1.24 | 45.3 |
| 3 | | 35.00 | 30.87 | | 28.81 | | 199.8 | 152.0 | 1.30 | 42.6 |
| 4 | 43.09 | 28.50 | 24.57 | | | | 281.0 | 150.3 | 1.87 | 43.4 |
| 5 | 30.46 | 30.40 | 20.10 | | 13.47 | | 166.2 | 75.5 | 2.20 | 37.0 |
| 6 | 42.28 | 31.90 | 24.64 | | | | 264.7 | 139.3 | 1.90 | 41.7 |

After lightly grinding or sanding the surfaces of the preform to assure open pores, the preform is infiltrated in the mold, FIG. 5 (vacuum or pressure differential) with molten metal, and at the same time the backing 51, FIG. 6, is produced to the desired thickness. The infiltrant metal for Example 1 was cast iron; for Examples 2, 4 and 6 a mixture of 93% copper and 6.5% tin; and for Examples 3 and 5, copper only.

Unusual physical properties of parts produced in accordance with the present invention can be realized upon comparison to the same part produced by standard powder metallurgy techniques. The part under consideration is a dry clutch facing for truck and tractor applications. In Table III set forth below, part XA, a dry clutch facing, was produced by the preform techniques above described, infiltrated with cast iron, and having a composition of 71 percent cast iron, 19 percent graphite particles and 10 percent mullite particles, the latter being an alumina-silica mineral. Part 8A was the same clutch facing, geometrically and dimensionally, and having the same composition except produced from 71 percent sponge iron particles, 19 percent graphite particles and 10 percent mullite particles.

TABLE III

|  | XA | 8A |
| --- | --- | --- |
| Hardness (Rockwell) | 87 | 50-80 |
| Transverse rupture (p.s.i.) | 7,700 | 4,000 |
| Coefficient of friction | 0.456 | 0.437 |
| Wear (inches) | 0.0011 | 0.0020 |

Clearly, harder and stronger structures are obtained under the present invention compared to production using standard powder metallurgy techniques. It is also significant to note in this connection that part 8A represents highly satisfactory commercial production of a dry clutch facing which is a standard in the industry for many applications.

The particles composing the preform will be selected on the basis of physical or mechanical properties. Thus in the instance of a bearing lining as above described, graphite is chosen for its low friction characteristics, but other non-metalic low friction particles may also be used. Again in the instance of a bearing, the infiltrant metal may be a bearing alloy such as bronze or the like presenting lower friction than ferrous metals, but inasmuch as the present invention enables graphite to be backed and supported by metal it is now possible to use aluminum or even iron as the backing metal. On the other hand, where friction parts are involved, such as brake or clutch facings, then the particles for the preform will be selected on the basis of good friction value, and low wear such as particles of silica, silicon carbide, alumina-silica minerals (e.g. mullite and sillimanite) and the infiltrant metal may be either non-ferrous or ferrous metal; in fact, metal particles may be used in the friction element facing.

While the present invention has been described primarily in terms of specific parts where friction plays a role, the invention is not so limited and in fact considerations of wear, hardness or toughness may also be criteria of parts produced under the present invention. The present invention has also been used to produce center plates and chafing plates having one section of manganese bronze and another section of graphites penetrated by manganese bronze; and the invention is applicable to the production of thrust washers and bearings which ordinarily present a flat antifriction or wear face.

Hence while we have illustrated and described preferred embodiments of our invention, it is to be understood that these may be varied and modified by those skilled in the art.

We claim:

1. A method of effecting metal infiltration completely of a porous body obtained at least in part from particulate non-metallic material while concurrently providing the body with a backing of metal identical to the infiltrating metal, comprising: sufficiently heating the particulate material in loose form, in the presence of a thermally decomposable temporary binder material distributed therethrough, so as to deposit between the particles, by pyrolysis of the binder, a bond which unites the particles into a porous self-sustaning structure of predetermined thickness; locating the porous structure thus obtained in a mold cavity having a depth greater than the thickness of said body whereby a portion of the mold cavity is unoccupied; infiltrating completely the porous body disposed in the mold cavity while simultaneously filling said unoccupied portion of the mold cavity with molten metal to produce a unified structure having a dense composite part corresponding to the porous body which exhibits the properties of both the metal and the particulate material and having a homogenous metal backing part of a thickness corresponding to the depth of said unoccupied portion of the mold cavity.

2. A method according to claim 1 in which the particulate material is graphite, and in which the porous structure is in the shape of a lining for a bearing or a friction element.

3. A method according to claim 1 in which the non-metallic is graphite and in which the infiltrant metal and metal of the backing is cast iron.

4. A method according to claim 1 in which the non-metallic is graphite and the infiltrant metal and metal of the backing is bronze.

5. A method according to claim 2 in which the porous body to be infiltrated is arcuate and in which a complemental support therefor is presented in the mold casting.

6. A method according to claim 1 in which the particulate material is selected from the group consisting of metal powders, silicon carbide, molybdenum disulfide, alumina, graphite and an aulmina-silicate mineral, and in which the infiltrant metal is selected from the group consisting of aluminum, bronze, copper and ferrous metal and alloys thereof.

References Cited
UNITED STATES PATENTS

| | | | |
| --- | --- | --- | --- |
| 2,979,793 | 4/1961 | Wilson et al. | 164—59 |
| 3,239,319 | 3/1966 | Pollard | 164—97X |
| 2,671,955 | 3/1954 | Grubel et al. | 29—182.5 |
| 2,390,160 | 12/1945 | Marvin | 29—149.5PM |
| 2,350,854 | 6/1944 | Whiteley | 29—149.5PM |
| 3,235,346 | 2/1966 | Hucke | 164—80X |
| 1,893,540 | 3/1931 | Edmondson et al. | 164—97X |
| 1,981,403 | 11/1934 | Weitzenkorn | 164—97X |
| 1,053,880 | 2/1913 | Scott et al. | Bonding Dig. |

J. SPENCE OVERHOLSER, Primary Examiner

V. K. RISING, Assistant Examiner

U.S. Cl. X.R.

29—191.2; 164—97, Digest 2; 308—1